Dec. 30, 1947.  J. J. HRUSKA  2,433,696
FLEXIBLE JOINT
Filed Feb. 25, 1944  3 Sheets-Sheet 1
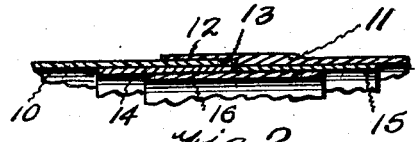
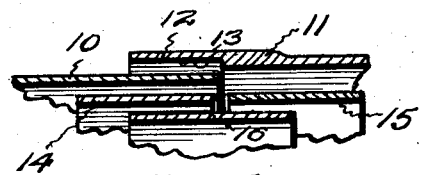
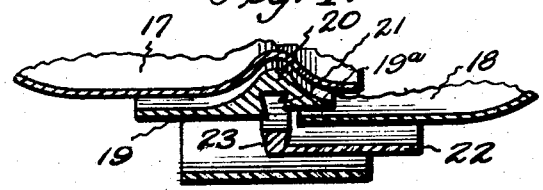
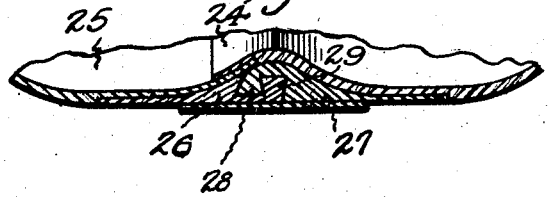
Inventor
JOSEPH J. HRUSKA Dec. 30, 1947. J. J. HRUSKA 2,433,696
FLEXIBLE JOINT
Filed Feb. 25, 1944 3 Sheets-Sheet 2
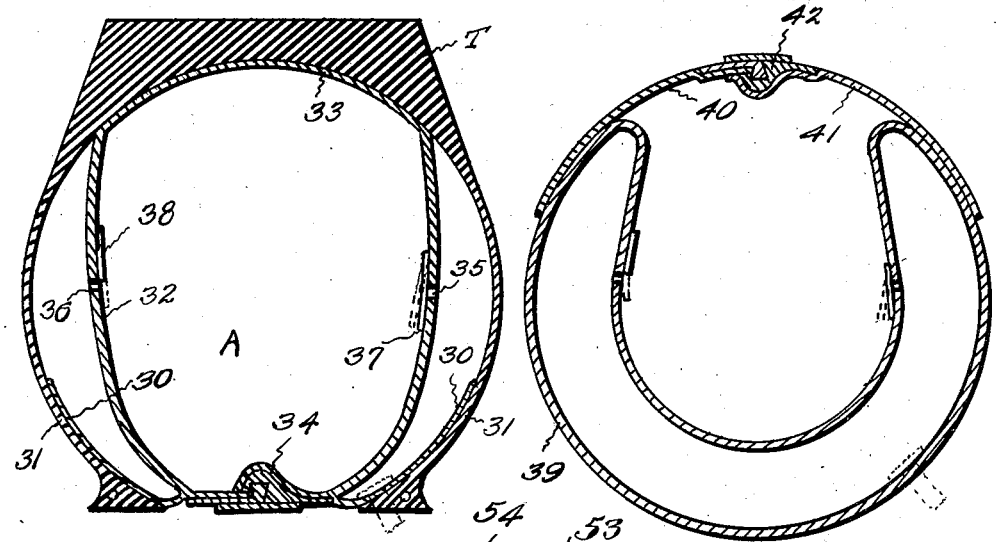
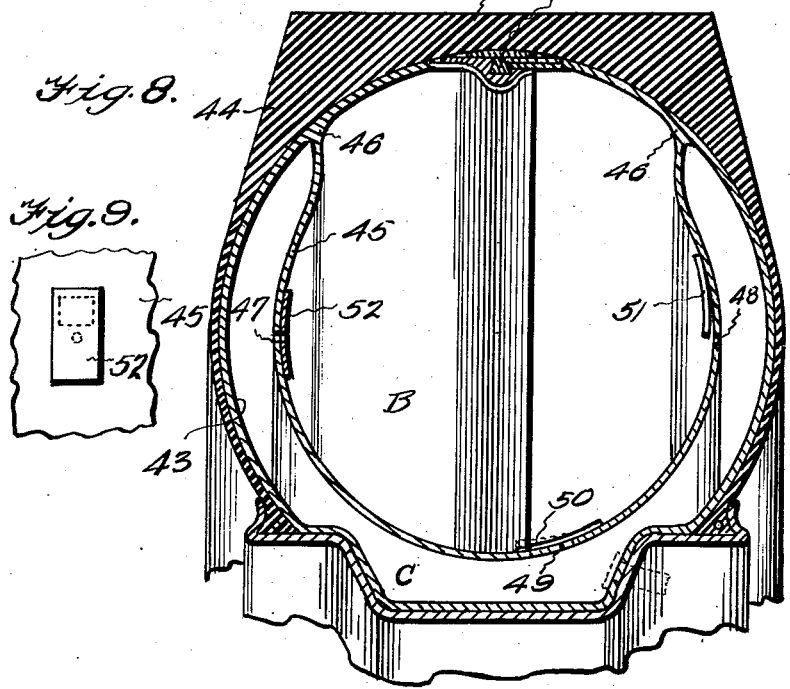
Inventor
JOSEPH J. HRUSKA
By Irving A. McCathran
Attorney

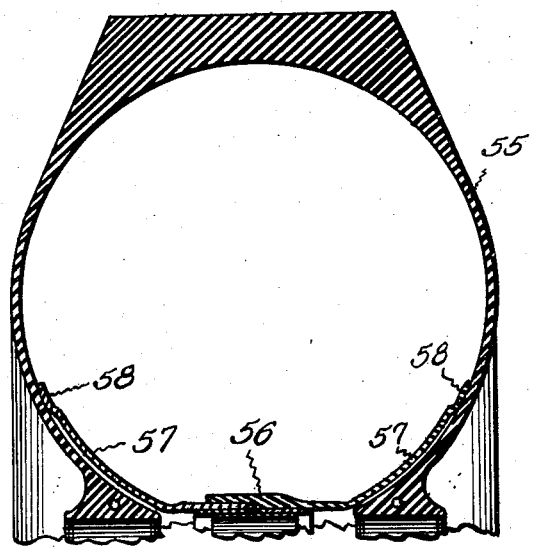
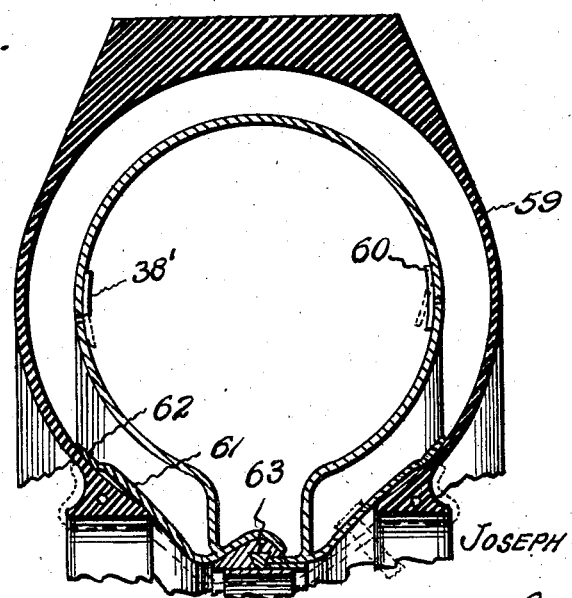

Patented Dec. 30, 1947

2,433,696

UNITED STATES PATENT OFFICE 2,433,696

FLEXIBLE JOINT

Joseph J. Hruska, Milwaukee, Wis.

Application February 25, 1944, Serial No. 523,855

5 Claims. (Cl. 154—42)

This invention relates to flexible joints and has for one of its objects the production of a flexible joint which is especially designed to be used on various items such as coveralls, boots, tires, inner tubes, and other articles requiring a water-tight or air-tight joint.

A further object of this invention is the production of a simple and efficient lock joint which may be quickly and easily joined to provide an air-tight and water-tight joint.

Other objects of this invention will appear throughout the following specification and claims.

In the drawings:

Figure 1 is a transverse sectional view through a simplified form of joint;

Figure 2 is a sectional view of the joint shown in Figure 1, with the various parts thereof drawn apart prior to assembly;

Figure 3 is a transverse sectional view of a modified type of lock joint;

Figure 4 is a transverse sectional view of the joint shown in Figure 3, with the parts thereof drawn apart prior to assembly;

Figure 5 is a transverse sectional view of a further modified form of lock joint;

Figure 6 is a transverse sectional view of a tire showing one form of lock joint for connecting the edges of the inner tube;

Figure 7 is a transverse sectional view through a special horseshoe type of reinforced inner tube;

Figure 8 is a transverse sectional view illustrating a further modified type of tire and tube using my improved flexible lock joint;

Figure 9 is a side view of a portion of one type of inner tube wall showing the closure flap for the vent aperture in the tube;

Figure 10 is a view similar to Figure 9 illustrating a slightly different form of tube and flap;

Figure 11 is a transverse sectional view of a further modified type of tire and tube; and Figure 12 is a transverse sectional view illustrating a still further modified type of tire and tube.

By referring to the drawings, it will be seen that 10 designates one edge of a flat or circumferential piece of material, such as good rubber, and 11 designates an edge of an adjoining piece of material, which latter piece is provided with an overlying flange or tongue 12 which overlaps the piece 10, as shown in Figure 1. The piece 11 is provided with an undercut portion 13 in which fits the adjoining edge of the piece 10 directly under the tongue 12. A reinforcing strip 14 of second grade rubber, about one-half inch thick is permanently vulcanized to the under face of the strip 10, and a similar reinforcing strip 15 is permanently vulcanized to the under face of the strip 11. An adhesive rubber or other sealing strip 16 is secured to the under faces of the reinforcing strips 14 and 15, and spans the junction of the strips 14 and 15 to bind and seal these strips together. The overlap of the tongue 12 with the strip 10 will also assist in preventing air and water leakage through the joint.

In Figures 3 and 4, there is shown a modified form of joint embodying a lock joint wherein an edge of one strip 17 overlaps the edge of an adjoining strip 18. These strips may be either flat or circumferential pieces of good rubber. A socket strip 19 is permanently vulcanized to the under face of the strip 17 and this socket strip 19 is provided with a reinforcing bead 20 upon its face adjacent the strip 17. A dovetail socket or channel 21 is formed in the under face of the socket strip 19 directly under the bead 20. A tongue strip 22 is permanently cemented to the under face of the strip 18, and this tongue strip 22 carries a dovetail tongue or rib 23 which fits into the channel 21. The strips 19 and 22 are preferably formed of second grade rubber. The edge of the strip 18 is fitted between the tongue strip 22 and the socket strip 19 and abuts against the tongue 23, as shown in Figure 3, when the joint is assembled. An adhesive sealing strip of adhesive rubber or other material spans the junction of the strips 19 and 22. The joint illustrated in Figure 3 may be easily assembled by lifting upwardly upon the portion 19$^a$ of the socket strip 19 to widen the dovetail channel 21 thereby permitting the dovetail tongue 23 to slip into the channel 21. The portion 19$^a$ is then released to lock the tongue in the channel, the elasticity of the material firmly holding the parts in locked assembled position.

In Figure 5 there is shown a further modified form of the invention wherein the strip 24 overlaps the strip 25, and the reinforcing strips 26 and 27 are provided with a double dovetail locking tongue-and-groove structure 28 and 29. The reinforcing strips 26 and 27 are preferably made of second grade rubber and are permanently vulcanized to the under faces of the rubber strips 24 and 25 which are preferably made of a good grade of rubber. An adhesive sealing strip of adhesive rubber or other material is secured to the under faces of the strips 26 and 27 and spans the junction of the strips 26 and 27.

From the foregoing description, it will be seen that I have perfected an efficient joint for connecting the adjoining edges of the two strips of flat or circumferential material in a manner to not only secure the edges together, but also to seal the joint against entrance of water or moisture and against the escape of air. The present device, although being especially adapted to secure the edges of an open inner tube together, or the tire casing itself, the joint also may be used for securing other articles together such as sealing the openings in coveralls, the attaching of rubber boots, gloves and the like, to rubberized coveralls. The lock joint may be used to cover a zipper, buttons or other fasteners, and may merely extend thereover after the fastener has been secured. The sealing strip of adhesive material may then be placed in position to seal the joint over the exterior of the lap joint or lock joint. The present form of joint may be used in a great number of ways and upon many articles where a tightly sealed joint is desired without departing from the spirit of the invention, so long as the changes necessary fall within the scope of the appended claims. The sealing strip in some instances may be of adhesive tape or any type of flexible adhesive material.

To open the joint illustrated in any of the forms shown in the drawings, simply cut the sealing strip between the reinforcing strips, such as the strips 14 and 15, or the strips 19 and 22, or strips 26 and 27, or pull the sealing strip away from the reinforcing strips. The joints illustrated may be again secured and sealed by a new sealing strip after repairs to the tube or tire have been made or after the joint upon the garment or article has been closed. It should be noted that the reinforcing strips are permanently secured to the supporting strips, and that the sealing strip only engages the reinforcing strips to seal the joints in each instance. The structure illustrated and described may be used upon an inner tube or tire of a type to fit any style of rim, whether flat or drop center rim. By using the type of flexible joint illustrated and described, on any cell or compartment, said cell or compartment may be repaired at any place, if ruptured or cut since access may be easily had to the interior or exterior of the tube by unfastening the flexible joint.

In Figures 6 to 8, inclusive, I have illustrated the manner in which my flexible lock joint may be used to secure the edges or beads and the like of a tire—that is to say, tire without an inner tube.

In the type of tube illustrated in Figure 6, it is preferable to provide an air entrance opening 35 in the wall 32 upon one side of the tube, and a circulating air control opening 36 in the wall 32 upon the opposite side of the tube. A closure flap 37 normally closes the air entrance opening 35 and should the side walls of the tire be punctured or injured, the control flap 38, as the tire is slightly deflated, will move downwardly to the dotted position closing the opening 36, thereby sealing the inner compartment A and in this way providing an emergency support for car to ride on and to prevent permanent injury to the tire casing. Because of the joint 34, the tube may be opened an access may be had to the interior of the tube for repair and the tube may, if desired, be easily detached from the casing to facilitate the repair of the casing. The tube, after proper repairs are made, may be reinserted in position and again sealed to operate in an efficient manner.

In Figure 7 a double walled tube 39 is illustrated which is provided with closure strips 40 and 41 vulcanized or secured to the horseshoe type double walled tube 39. A flexible lock joint 42 connects the strips 40 and 41 together, and this joint is similar to the joint shown in Figures 3 and 4, and seals the tube against the entrance of water and the escape of air. The type of joint shown in Figure 5 may be used without departing from the spirit of the invention.

In Figure 8, I have illustrated a double compartment tube 43 in a drop center rim and mounted in a casing 44. The tube 43 is provided with a strongly reinforced inside inner tube wall 45, for the purpose of carrying the load safely on the road if the tire casing or outside wall of the tube 43 should become injured or punctured. The inside inner tube wall 45 is preferably vulcanized at 46 to the outside wall of the inner tube 43, or the tube 43 is vulcanized to the wall 45, and the outside tube being soft will provide flexibility in the tire. The wall 45 is provided with openings or apertures 47, 48 and 49. The aperture 49 will only admit air into the interior of the inner tube, or into the compartment B and a flap 50 will prevent air from leaking from compartment B into compartment C, should the tire casing and the outside wall 43 of the tube become injured or punctured, in which event the air within the compartment B will provide a support for the car. The reserve reservoir B will act as an emergency tire to permit the driver of a car to keep the car on the road and steer easily and safely away from a ditch or the adjacent traffic. The opening or aperture 48 permits air circulation between compartments B and C, but only if the tire casing and both inner tubes are in normal condition at atmospheric pressure and with no weight of the car on the tires or when the whole tire structure is fully and properly inflated inside and outside, that is to say compartments B and C are inflated. Should tire casing and outside inner tube collapse, deflating compartment C, the outside compartment C will collapse. The weight of the car upon the tire will then compress the walls of the inside inner tube, expanding them to right and left. The flap 51 which is secured at its upper end to the inner face of the wall 45 and is loose at its lower end, will slide downwardly thereby closing the aperture 48, trapping air inside of compartment B and preventing deflation or collapse of compartment B through the aperture 48. The compartment B acts as a tire for holding the car on the road and permits the driver to steer away from a ditch or oncoming traffic.

The aperture 47 has the same purpose as the aperture 48 to assist circulation of air from compartment B to compartment C, while under atmospheric pressure, or while the tube is properly inflated, but the apertured flap 52 will close the aperture 47 should the tire become deflated and thereby prevent air leakage to and from the inner tubes. The purpose of these flaps 51 and 52 is the same, although they differ in structure. These flaps may be made similar if desired, and any number of apertures and flaps may be used without departing from the spirit of the invention.

In the form shown in Figure 8, the flexible lock joint 53, which is similar to that shown in Figure 3, and may if desired be similar to Figure 5, is located in a position to rest against the inner face of the thread 54 of the tire casing 44 so that the wall 45 may be spaced from the rim as shown in Figure 8.

By means of the type of inner tube illustrated, the walls of the inner tube may be made of two or three-ply material, if desired, so that the reserve or safety inner tube may permit the car and tire to stand up for a sufficient length of time and distance to prevent the tire from flying off the rim and from becoming suddenly deflated. This will permit the driver to easily steer the car to safety on the emergency tube or inner tube, to a safe place where repairs may be made. It should be understood that any number of apertures, such as the apertures 35 shown in Figure 6, and the apertures 47, 48 and 49, shown in Figure 8, may be employed without departing from the spirit of the invention and that various types of closures may be provided.

It should be understood that the present features illustrated and described may be employed upon various types of tires and inner tubes, and in connection with various shapes and designs of rims which are constructed to support the tires.

In connection with the joint illustrated in detail in Figures 1 to 5, inclusive, it should be understood that this joint may be used on any rim, flat or drop center, and may also be utilized to seal the opening of rubberized coveralls from head to heel, and render the same water-proof by closing the coverall over the buttons or buckles, and fasteners such as zippers, either temporarily or permanently. Such a fastener would be very useful for soldiers, sailors, commandos, invading forces, torpedoed ship personnel, and would enable these persons to keep dry and warm if compelled to stay in the water for a long time. Furthermore, a joint of this type illustrated in Figures 1 to 5, might be used upon boots so as to attach a boot to, or detach the same from, rubber coveralls, quickly and without injury to the fabric. This type of joint may also be used for a single cell or a multiple compartment tire, and upon any article which may require one or more air or water-tight cells or compartments.

In Figure 11, I have illustrated a tubeless automobile tire where no inner tube is used. In this structure the tire 55 carries a strip 57 on each side, and each strip 57 is vulcanized, as at 58, to the inner face of the tire 58. The free ends of the strips 57 are secured together to provide a seal by means of a joint 56.

In Figure 12, I have illustrated a tire 59 with an inner tube 60 which forms a part of the side strips 61. The strips 61 are vulcanized to the inner face of the tire 59 and their free ends are joined and sealed by a joint 63. The inner tube 60 is spaced from the side walls and tread of the tire casing, as shown, to provide inner and outer compartments. The inner tube 60, if desired, may be provided with valve flaps and valves 64 similar to the flaps 36 and 35 shown in Figure 6 and also indicated in Figure 7.

It should be understood that certain detail changes in the construction may be employed without departing from the spirit of the invention, so long as such changes fall within the scope of the appended claims.

Having described the invention, what I claim as new is:

1. A joint of the class described comprising a plurality of overlapping portions of material the inner faces of which are flush, a reinforcing strip fixedly secured to one face of each portion, the reinforcing strips extending in substantially the same plane and having abutting edges, and a detachable sealing strip engaging the reinforcing strips and spanning the abutting edges thereof for providing an air and water-tight joint.

2. A joint of the class described comprising a plurality of portions of material, a reinforcing strip fixedly secured to one face of each portion, the reinforcing strips extending in substantially the same plane and having abutting edges, a removable sealing strip engaging the reinforcing strips and spanning the abutting edges thereof for providing an air and water-tight joint, and an interlocking joint releasably connecting the abutting edges of said reinforcing strips.

3. A joint of the class described comprising a plurality of portions of material, a reinforcing strip fixedly secured to one face of each portion, the reinforcing strips extending in substantially the same plane and having abutting edges, a removable sealing strip engaging the reinforcing strips and spanning the abutting edges thereof for providing an air and water-tight joint, and a dovetail connecting joint releasably interlocking said abutting edges together.

4. A joint of the class described comprising a plurality of portions of material, a reinforcing strip fixedly secured to one face of each portion, the reinforcing strips extending in substantially the same plane and having abutting edges, a removable adhesive sealing strip engaging the reinforcing strips and spanning the abutting edges thereof for providing an air and water-tight joint, and a dovetail connecting joint releasably interlocking said abutting edges together.

5. A joint of the class described comprising a plurality of portions of material, a reinforcing strip fixedly secured to one face of each portion, the reinforcing strips extending in substantially the same plane and having abutting edges, a removable sealing strip engaging the reinforcing strips and spanning the abutting edges thereof for providing an air and water-tight joint, and a double dovetail connecting joint releasably interlocking said abutting edges together.

JOSEPH J. HRUSKA.

REFERENCES CITED

The following references are of record in the file of this patent:

UNITED STATES PATENTS

| Number | Name | Date |
|---|---|---|
| 194,972 | Mosher | Sept. 11, 1877 |
| 341,864 | Woodley | May 11, 1886 |
| 501,716 | Hardwick | July 18, 1893 |
| 511,595 | Douglas | Dec. 26, 1893 |
| 549,766 | Conway | Nov. 12, 1895 |
| 559,937 | Douglas | May 12, 1896 |
| 607,043 | James | July 12, 1898 |
| 608,273 | Scott | Aug. 2, 1898 |
| 1,342,441 | Hampton | June 8, 1920 |
| 1,583,388 | Clark | May 4, 1926 |
| 2,104,048 | Marshall | Jan. 4, 1938 |
| 2,173,065 | Lee | Sept. 12, 1939 |

FOREIGN PATENTS

| Number | Country | Date |
|---|---|---|
| 15,365 | Australia | 1928 |